(12) United States Patent
Childs (10) Patent No.: US 10,170,986 B2
(45) Date of Patent: Jan. 1, 2019

(54) HYBRID BUCK

(71) Applicant: Dialog Semiconductor (UK) Limited, London (GB)

(72) Inventor: Mark Childs, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/189,210

(22) Filed: Jun. 22, 2016

(65) Prior Publication Data

US 2017/0373594 A1     Dec. 28, 2017

(51) Int. Cl.
*H02M 3/157*   (2006.01)
*H02M 1/08*    (2006.01)
*H02M 3/158*   (2006.01)
*H02M 1/00*    (2006.01)

(52) U.S. Cl.
CPC .............. *H02M 3/157* (2013.01); *H02M 1/08* (2013.01); *H02M 3/1588* (2013.01); *H02M 2001/0032* (2013.01); *H02M 2003/1586* (2013.01)

(58) Field of Classification Search
CPC ........ H02M 3/10; H02M 3/135; H02M 3/145; H02M 3/155; H02M 3/156; H02M 3/157; H02M 3/158; H02M 3/1584; G05F 1/52; G05F 1/56
USPC .......................... 323/265, 271, 282, 283, 351
See application file for complete search history.

(56) References Cited

U.S. PATENT DOCUMENTS

| 7,107,468 B2 | 9/2006 | Pullen et al. |
| 7,541,794 B2 | 6/2009 | Tabaian et al. |
| 7,791,321 B2 | 9/2010 | Xu et al. |
| 9,077,244 B2 * | 7/2015 | Wu ...................... H02M 3/1584 |
| 9,742,280 B2 * | 8/2017 | Childs ................... H02M 3/158 |
| 9,837,906 B1 * | 12/2017 | Childs ................... H02M 3/1582 |
| 2005/0093525 A1 | 5/2005 | Walters et al. |

(Continued)

FOREIGN PATENT DOCUMENTS

| DE | 100 47 230 | 5/2001 |
| DE | 10 2016 210 187 | 12/2016 |

OTHER PUBLICATIONS

Co-pending U.S. Appl. No. 15/175,301, filed Jun. 7, 2016, "Dynamic Clock Divide for Current Boosting," 21 pgs. by Mark Childs et al.

(Continued)

*Primary Examiner* — Adolf Berhane
(74) *Attorney, Agent, or Firm* — Saile Ackerman LLC; Stephen B. Ackerman (57) ABSTRACT

A system is disclosed which allows for a multiphase Buck switching converter, where some phases operate in peak-mode current control, and some phases operate in valley-mode current control, simultaneously with the peak-mode phases. The peak-mode phases of the switching converter operate at lower frequency, and with a higher value inductor than the valley mode phases. The peak-mode phases support discontinuous control mode (DCM) operation and continuous control mode (CCM) operation, and the valley-mode phases only support CCM operation. The peak-mode phases of the switching converter are always enabled, and the valley-mode phases are only enabled at high currents. The peak-mode and valley-mode currents are matched with a peak current servo, for better efficiency.

23 Claims, 7 Drawing Sheets

(56) References Cited

U.S. PATENT DOCUMENTS

| | | | | |
|---|---|---|---|---|
| 2011/0018515 A1* | 1/2011 | McCloy-Stevens | ......................... | H02M 3/1588 |
| | | | | 323/284 |
| 2012/0062190 A1* | 3/2012 | Haiplik | ................. | H02M 3/156 |
| | | | | 323/271 |
| 2014/0049239 A1* | 2/2014 | Labbe | ................... | H02M 3/156 |
| | | | | 323/282 |
| 2014/0062433 A1* | 3/2014 | Zhou | ..................... | H02M 3/158 |
| | | | | 323/271 |
| 2014/0333270 A1* | 11/2014 | Young | ....................... | G05F 1/12 |
| | | | | 323/234 |
| 2015/0115917 A1 | 4/2015 | Yu et al. | | |

OTHER PUBLICATIONS

Co-pending U.S. Appl. No. 62/173,454, filed Jun. 20, 2015, "Dynamic Clock Divide for Current Boosting," 21 pgs., by Mark Childs et al.
German Office Action, File Number: 10 2016 214 446.4, Applicant: Dialog Semiconductor (UK) Limited, dated Apr. 3, 2017, 8 pgs, and English language translation, 9 pgs.

* cited by examiner

HYBRID BUCK

RELATED PATENT APPLICATIONS

This application is related to U.S. application Ser. No. 15/701,946, filed on Sep. 12, 2017, which is owned by a common assignee and is herein incorporated by reference in its entirety. This application is also related to U.S. Provisional application 62/173,454, filed on Jun. 10, 2015, now filed as U.S. application Ser. No. 15/175,301, filed on Jun. 7, 2016 which is owned by a common assignee and is herein incorporated by reference in its entirety.

BACKGROUND

Field

This disclosure relates generally to Buck, Boost, and other types of DC-DC switching power converters, operating in peak-mode and valley-mode current control at different switching frequencies.

Description of Related Art

Existing buck, boost, and other switching converters use peak-mode current control. This offers very good performance with a good degree of flexibility in the application. An advantage of peak-mode current control is that it naturally supports discontinuous control mode (DCM), when the current through the inductor falls to zero and the inductor is completely discharged at the end of the cycle.

A direct peak-mode control loop is commonly used in Buck switching converters. In this type of system, the PMOS peak current limit is controlled and proportional to the voltage error at the Buck output. This scheme is then compensated against sub-harmonic oscillation, by subtracting a fixed compensation ramp from the peak current limit over each cycle. To implement a fixed current limit, for over-current protection, a high clamp level is needed, above which the peak current limit is not allowed to rise.

Peak-mode buck converters are relatively simple to design and have very good performance with a good range of outputs. Their design involves direct peak-mode control architecture, where the peak high side device current limit is allowed to vary proportional to the output voltage error of the buck switching converter. The direct peak-mode control system naturally works in DCM without modification, and allows many features of the switching converter to operate smoothly.

Figure 1:
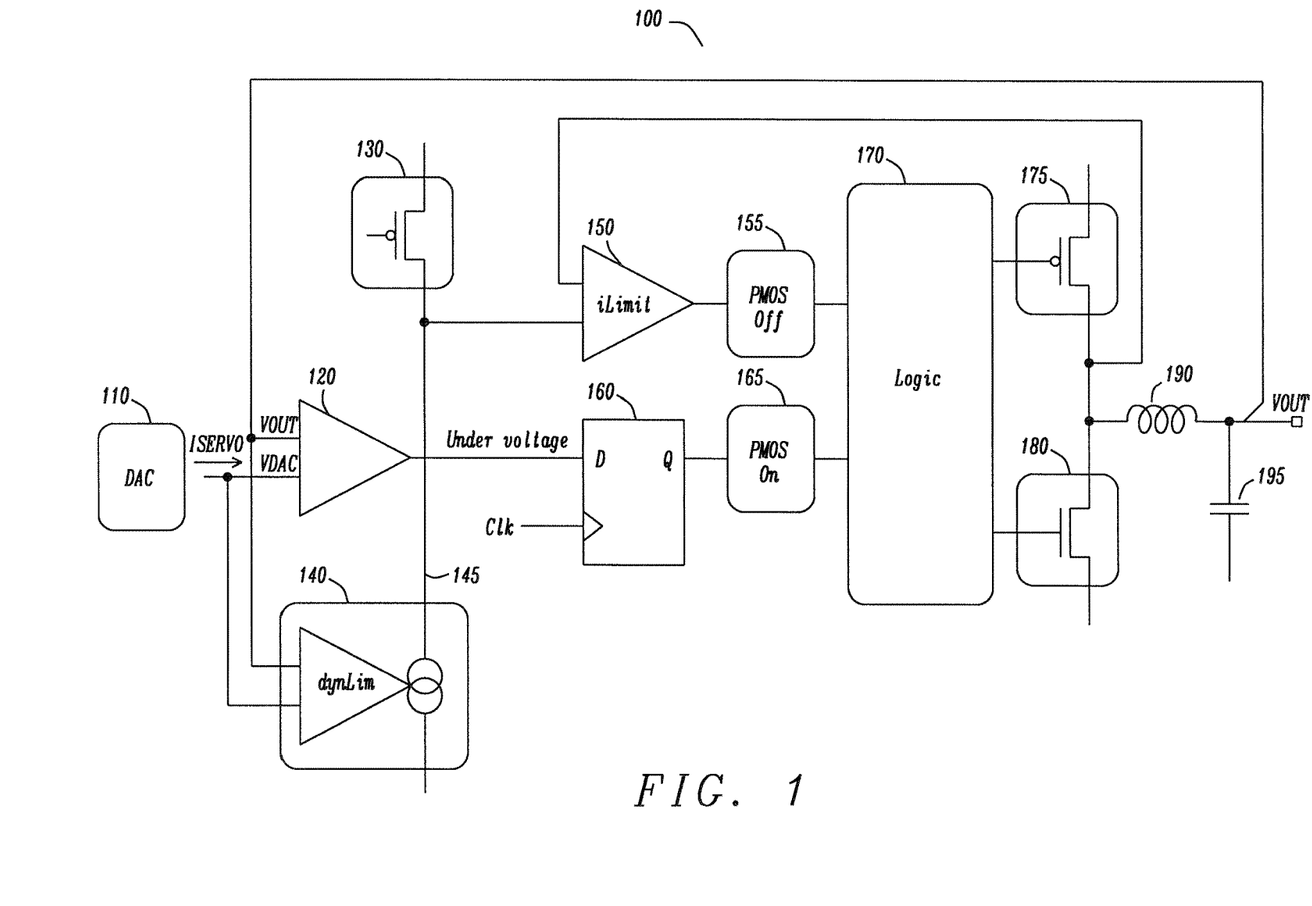
FIG. 1 is a circuit diagram illustrating a peak current mode Buck switching converter, where the peak PMOS current limit is proportional to the output voltage error.

FIG. 1 is circuit diagram 100, which illustrates a peak current mode buck switching converter, where peak PMOS current limit 145 is proportional to the output voltage error. High side device 175 is turned on with control 165, through logic 170, each cycle by the clock. The high side device is then turned off with control 155, by current limit 150. When the high side device is turned off, low side device 180 is turned on through logic 170, each cycle by the clock. The current limit is controlled by OTA DYNLIM 140, which compares the buck target reference voltage VDAC, from DAC 110, with the output feedback voltage VOUT, across capacitor 195. OTA current limit 140 serves to control the peak coil current, through inductor 190. Under-voltage comparator 120 provides pulse skipping to the clock in latch 160, when the load is very low.

SUMMARY

An object of this disclosure is to implement a Buck switching converter with a mixture of peak-mode and valley-mode phases in a single Buck switching converter, operating together simultaneously, using the same current control.

Further, another object of this disclosure is to require that some of the phases operate in peak-mode current control.

Still further, another object of this disclosure is to require that some other phases operate in valley-mode current control.

To accomplish the above and other objects, a multiphase Buck switching converter is disclosed, having peak-mode phases operate at lower frequencies than the valley-mode phases and with higher value inductors. The peak-mode phases support discontinuous control mode (DCM) operation, when the current through the inductor falls to zero during the cycle, and are always enabled, and continuous control mode (CCM) operation, when the current through the inductor never falls to zero during the cycle. The valley-mode phases only support continuous control mode (CCM) operation, and only enabled at high currents. An offset current balances the peak current of all phases.

The above and other objects are further achieved by a method for a multiphase Buck switching converter providing both peak-mode and valley-mode phases. The steps include providing a Hybrid Buck switching converter providing peak-mode master and slave phases for low loads and DCM/CCM operation, and adding valley-mode slave phases for higher loads and CCM operation, only. A Hybrid Buck switching converter provides the peak-mode and valley-mode currents of all phases together. A common Operational Transconductance Amplifier (OTA) provides both peak-mode and valley-mode current limits. A peak current servo is provided to match the peak-mode and valley-mode currents for better efficiency.

In various embodiments, the function may be achieved implementing a Buck switching converter with phases at different frequencies and different coil values.

In various embodiments, the function may be achieved implementing a PMOS high side device and an NMOS low side device.

DETAILED DESCRIPTION

A Buck switching converter generally operates with low duty cycles, for a high input supply and a low output voltage. As switching frequencies increase, the high side device on time becomes very short and it becomes difficult or impossible to implement the high side device current limit function. The control loop fails to regulate, making it impossible to use peak-mode current control in the switching converter. For the present disclosure, a combination of peak-mode and valley-mode switching converters may be implemented with different frequencies. This allows the high frequency operation of a valley-mode switching converter, while peak-mode phases may be retained to support low-load operation with low frequency and high inductance. While valley-mode current control may present an issue with DCM, the design of a DCM peak-mode switching converter is incorporated.

For high switching frequency, valley-mode control becomes more practical. In valley-mode control, the low side device is turned on by the clock and turned off by the control loop. The high side device on time is then defined only by the turn off time of the low side device, allowing for much higher switching frequencies. The use of valley-mode current control allows the high side device on time issue to be sidestepped, as disclosed in related patent application Ser. No. 15/701,946, filed on Sep. 12, 2017, where the valley-mode low side device current is controlled. The high side device and low side device are typically, but not limited to, a PMOS and NMOS device, respectively.

Figure 2A:
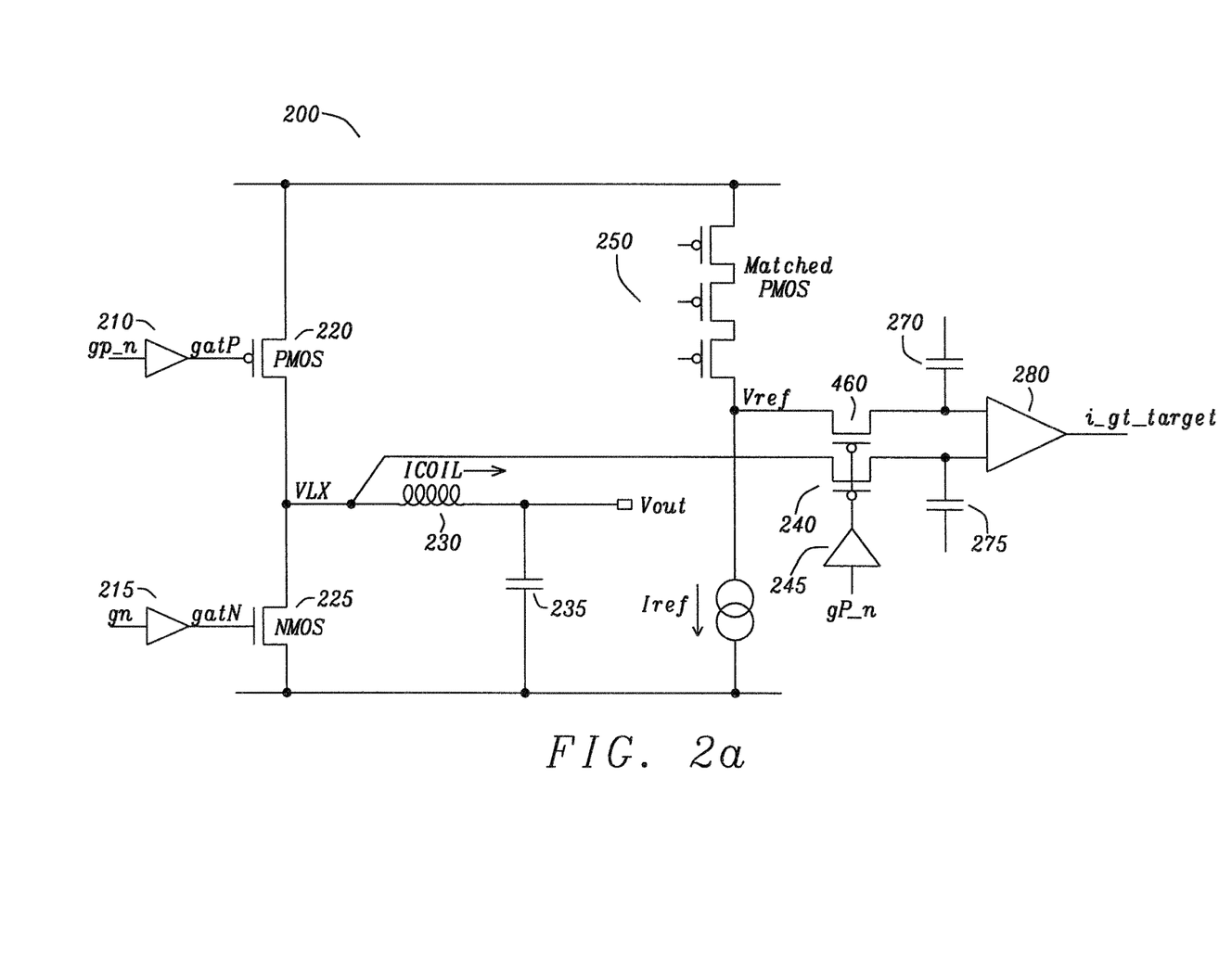
FIG. 2a is a circuit diagram illustrating a Buck switching converter implemented with a peak current servo, where sampling and comparing the LX node and reference voltages is achieved.

FIG. 2a is circuit diagram 200 illustrating a Buck switching converter implemented with a peak current servo, where sampling and comparing the LX node and reference voltages is achieved, embodying the principles of the disclosure. The circuit samples node voltage VLX, and stores output voltage VOUT, across inductor 230, on capacitor 235. Reference voltage VREF is also sampled.

Reference current IREF is drawn through matched PMOS 250, which matches part of the PMOS pass-devices. The reference current generates a voltage drop across the matched devices, which is compared to the voltage drop VLX in high side pass-device 220, turned on with GATP low, and GP_N high, through inverter 210. Sampling switches 240 and 260 are turned on with the same control signal GP_N, through inverter 245. The voltage on VLX will ring and eventually settle. When high side pass-device 220 is turned off by GP_N going low, the sampling switches will also turn off. This will store the final values of VLX and VREF, on sampling capacitors 270 and 275, as inputs to comparator 280. High side device 220 is typically, but not limited to, a PMOS device.

Comparator 280 only samples the final values during low side device 225 on time, and may be of the sense-amplifier type, to ensure high accuracy and low complexity. Low side device 225 is turned on with GATN high, as determined by GN low, through inverter 215. The comparator determines which voltage is larger, the final node voltage VLX at the end of the high side device on time, or the reference voltage VREF. The output of the comparator sets signal I_GT_TARGET, when the peak current is greater than the target current limit. Low side device 225 is typically, but not limited to, an NMOS device.

Figure 2B:
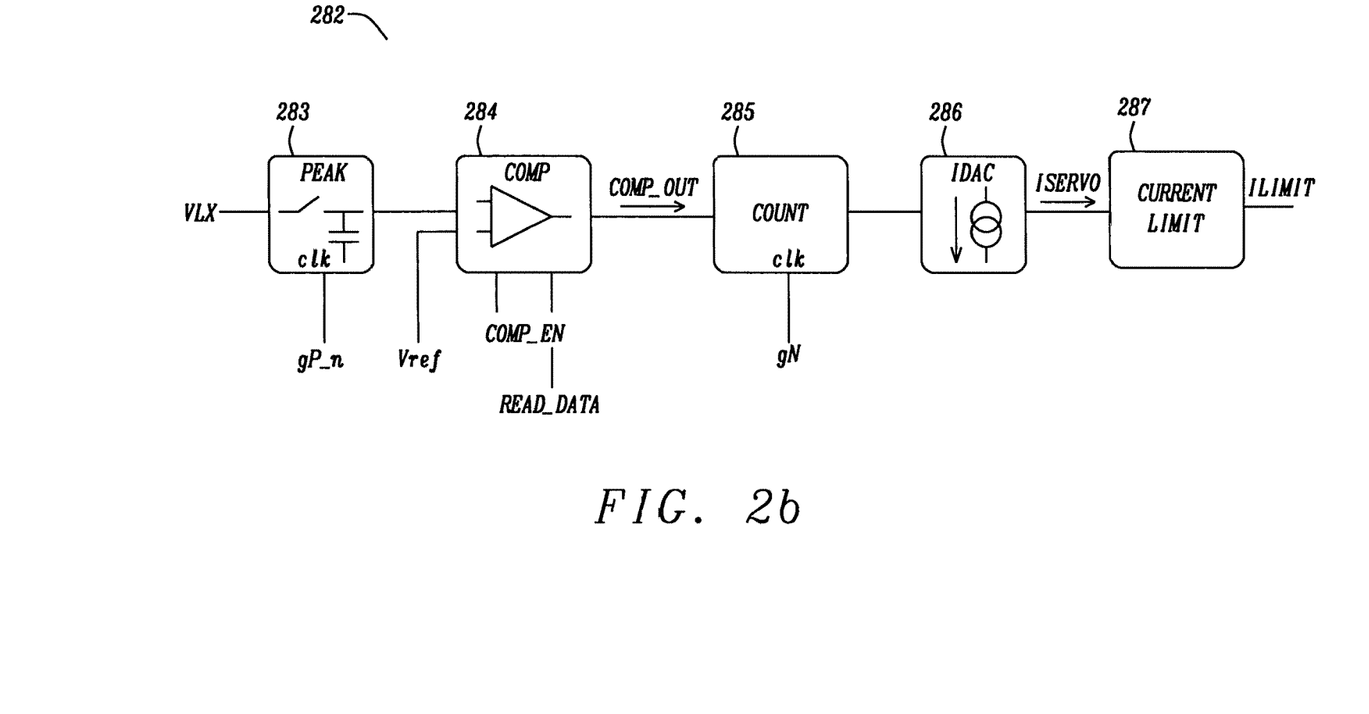
FIG. 2b is a block diagram showing the peak current servo method for a Buck switching converter.

FIG. 2b is block diagram 282 showing the peak current servo method of circuit 200, for a Buck switching converter, embodying the principles of the disclosure. Node Voltage VLX, at the drain of high side device 220 and the drain of low side device 225, is sampled across switch 240 and capacitor 275, in 283 as ILIMIT. The sampling is done at the point of peak coil current ICOIL, as high side device 220 turns off with control signal GP_N, through inverter 210. The sampled node voltage VLX is compared to reference voltage VREF, the voltage drop across matched devices 250, in 284, to determine if the peak coil current is higher or lower than the peak target current, as determined by an OTA programmed to a maximum value. The output of comparator 280 determines whether counter 285 increments or decrements each cycle with control signal GN. The output of the counter is used to program the output IDAC current ISERVO 286, to raise the peak valley-mode current or lower the peak peak-mode current, respectively. ISERVO is used to offset the current limit, to remove the effect of the compensation ramp and coil current ripple hum the switching converter, in 287, in ILIMIT. This offset serves to remove the effect of the compensation ramp and coil current ripple from the switching converter, as disclosed in related patent application Ser. No. 15/701,946, filed on Sep. 12, 2017.

Valley-mode control is much harder to design with practical discontinuous control mode (DCM) operation. At low load currents, the output should not always be switching, and in valley-mode control the first operation is to turn the low side device on. This is not the correct behavior for pulse-frequency modulation (PFM) mode, when driving light loads. In PFM mode, the switching frequency is reduced while preventing the inductor current from dropping below zero. The loop control logic could be used to turn the high side device on, but it is unclear when to turn the low side device on. To maximize efficiency, the peak current should be well controlled in PFM mode. This would necessitate adding a peak-mode control loop within the valley-mode control loop. As a solution, the present disclosure proposes a Hybrid Buck switching converter, using both peak-mode and valley-mode phases together.

Figure 2C:
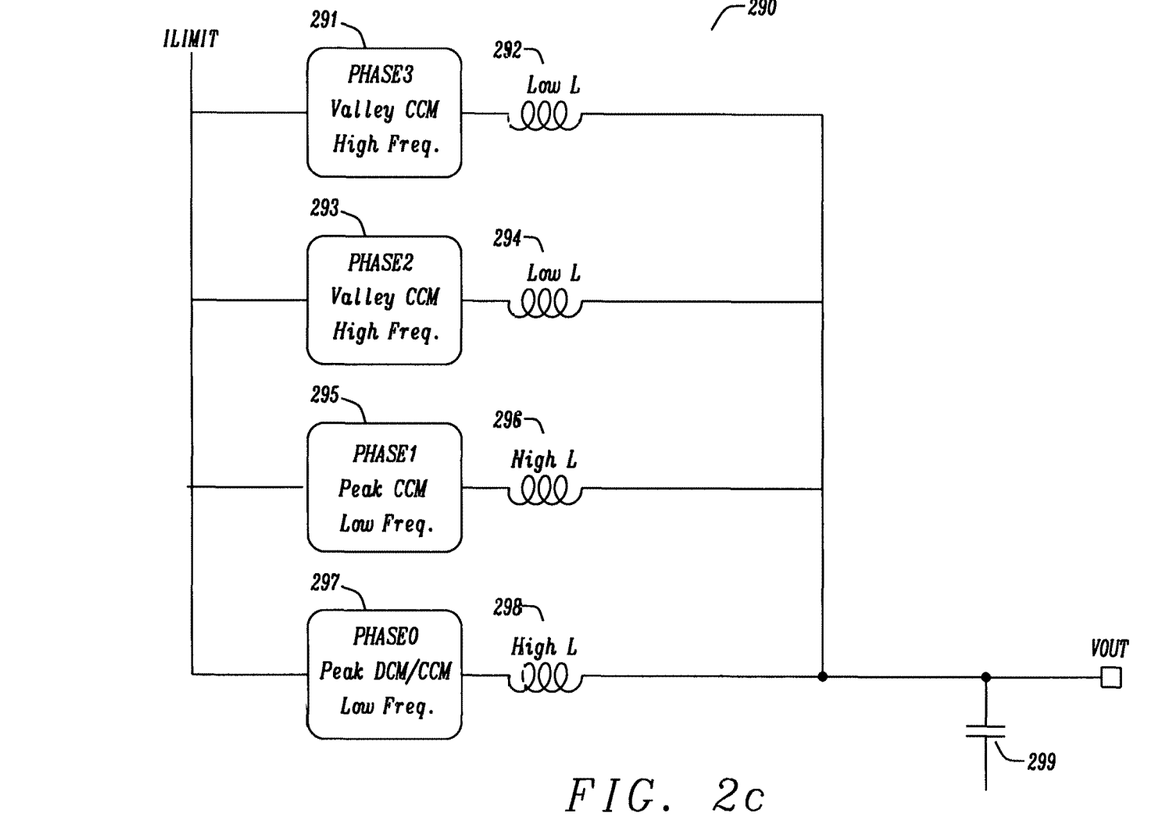
FIG. 2c is a block diagram illustrating a Hybrid Buck switching converter, using both peak-mode and valley-mode current phases, embodying the principles of the disclosure.

FIG. 2c is block diagram 290 illustrating a Hybrid Buck switching converter, using both peak-mode and valley-mode current phases, embodying the principles of the disclosure. A master phase0 297 is defined, which will operate at low loads. This master phase will use peak-mode control and support discontinuous and continuous modes of operation. A slave phase1 295 is defined, with inductor 296, which will operate at low frequency and high inductance. This slave phase does not support DCM, but will operate only in continuous conduction mode. The master phase would typically use a much lower switching frequency, and a much larger and higher value inductor, 298. The slave phases phase2 293 and phase3 291 would then typically use a much higher switching frequencies and much smaller value inductors, 294 and 292 respectively. This simplifies the valley-mode phase design substantially, and the output voltage VOUT is stored across capacitor 299, in the Hybrid Buck of the disclosure. One peak current limit, ILIMIT, is configured for the peak-mode phases and the valley-mode slave phases, and the coil currents of the peak-mode phases and the valley-mode phases are configured using peak current servo, ISERVO.

There is no limit to how many master and slave phases may be defined. Multiple master phases may operate at different frequencies and with different coil values. Multiple slave phases may operate at different frequencies and with different coil values. Not all peak mode phases must support DCM operation, but at least one should.

Figure 3:
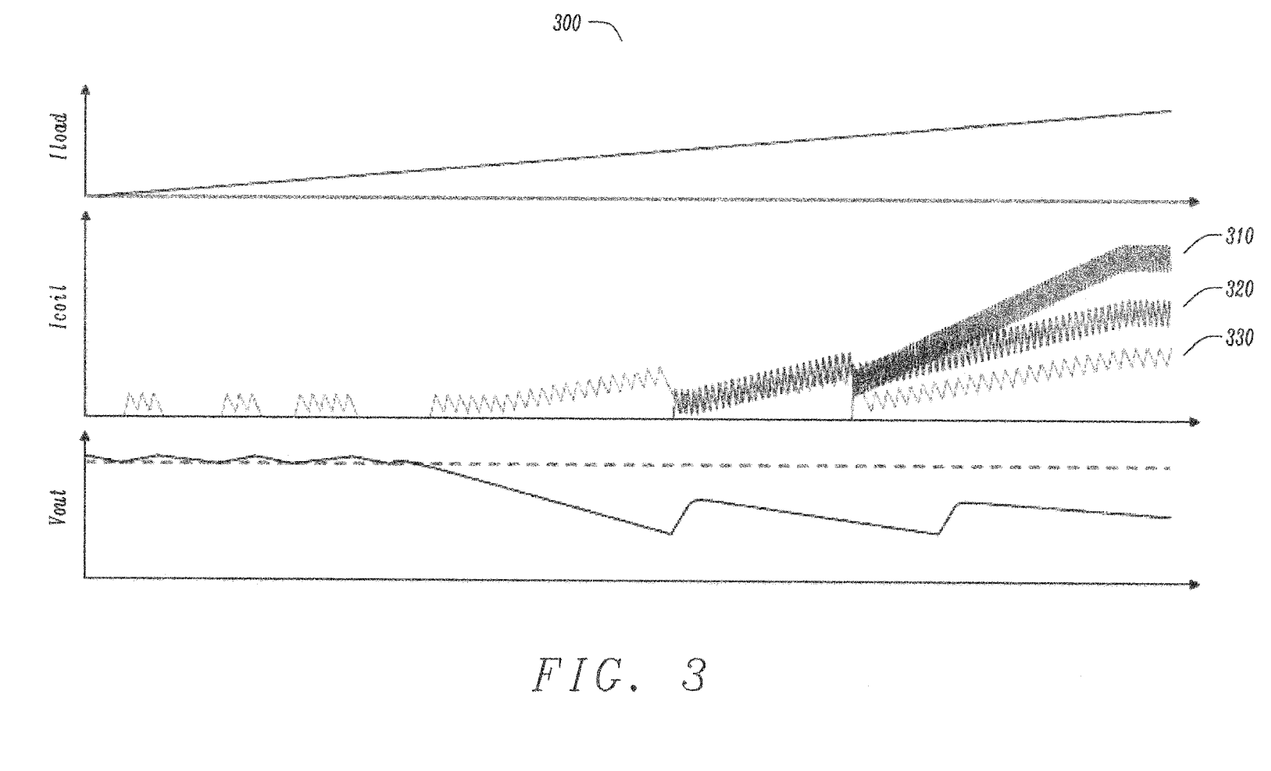
FIG. 3 is a signal diagram illustrating the operation of a Hybrid Buck switching converter, with multiple phases operating over different load ranges, embodying the principles of the disclosure.

FIG. 3 is signal diagram 300 illustrating the operation of a Hybrid Buck switching converter, with multiple phases operating over different ILOAD ranges, embodying the principles of the disclosure. Only the master phase, operating at low loads and using peak-mode control, supports discontinuous mode operation, as shown in the left most portion of FIG. 3. The slave phases, using peak and valley-mode controls, support continuous conduction mode. The ICOIL current of master 330 and slave phases 310 and 320 are controlled by an OTA control current programmed to a maximum value. Only a single OTA is provided, and the output from this is used for both the master and the slave phases. The OTA current defines the peak coil current in the master and slave peak-mode phases for lower frequencies and larger inductors, and the valley coil current in the slave valley-mode phases for higher frequencies and smaller inductors. Using peak-mode control in master and slave phases, and valley-mode control in slave phases, allows the Buck switching converter to regulate VOUT correctly as a single converter. It is beneficial to balance the coil currents between the peak-mode and valley-mode phases, and this can be done using the peak current servo disclosed in related patent application Ser. No. 15/701,946, filed on Sep. 12, 2017.

Figure 4:
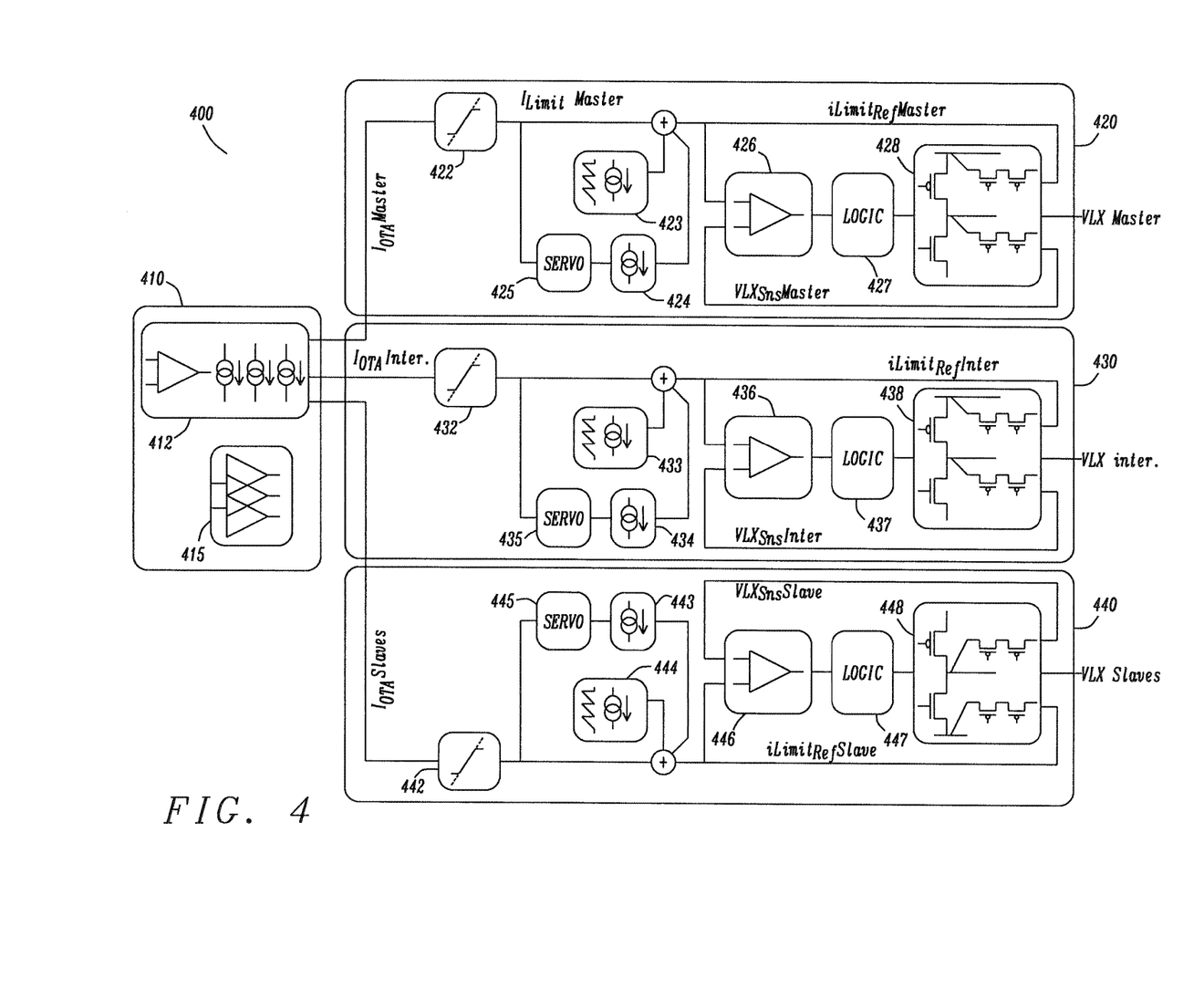
FIG. 4 is a block diagram illustrating a detailed system of a Hybrid Buck switching converter, using both peak-mode and valley-mode control, and a common operational transconductance amplifier to control all phases, embodying the principles of the disclosure.

FIG. 4 is block diagram 400 illustrating a detailed system of a Hybrid Buck switching converter, using both peak-mode and valley-mode control, and a common operational transconductance amplifier (OTA) for current control of all phases, embodying the principles of the disclosure. This system implements a fixed compensation ramp in each phase to prevent sub-harmonic oscillation and also makes use of a peak-current servo to match the current limits to the OTA control current, programmed to a maximum value.

Transconductance (gm) stage 410 of block diagram 400 is comprised of OTA logic 412. OTA logic 412 produces a peak current limit, proportional to the DAC reference voltage compared to the output feedback voltage, both of which are inputs to OTA logic 412. This same peak current limit is used in the peak current servos of peak-mode master phase 420, peak-mode slave phase 430, and valley-mode slave phase 440. The peak current limit controls all peak-mode and valley-mode currents, with IOTA_MASTER driving target current limit 422 in peak-mode master, IOTA_INTER driving target current limit 432 in peak-mode slave, and IOTA_SLAVE driving target current limit 442 in valley-mode slave.

Peak-mode master phase 420 is comprised of peak current servo 425 and comparator 426, compensation ramp 423, and reference current 424. Control logic 427 considers the output of the peak current servo, reference current, and target current limit ILIMIT_MASTER, in ILIMIT_REF_MASTER, and modifies the offset current to move the peak-mode current upwards closer to the current limit. VLX_SNS_MASTER is an input to the comparator, and if the output is low, control logic 427 works to turn the high side device of the peak current servo off.

Peak-mode slave phase 430 is comprised of peak current servo 435 and comparator 436, compensation ramp 433, and reference current 434. Control logic 437 considers the output of the peak current servo, reference current, and target current limit, in ILIMIT_REF_INTER, and modifies the offset current to move the peak-mode current upwards closer to the current limit. VLX_SNS_INTER is an input to the comparator, and if the output is low, control logic 437 works to turn the high side device of the peak current servo off.

Valley-mode slave phase 440 is comprised of peak current servo 445 and comparator 446, compensation ramp 443, and reference current 444. Control logic 447 considers the output of the peak current servo, reference current, and target current limit, in ILIMIT_REF_SLAVE, and modifies the offset current to move the valley-mode current downwards closer to the current limit. VLX_SNS_SLAVES is an input to the comparator, and if the output is high, control logic 447 works to turn the high side device of the peak current servo off.

The OTA current from block 410 is output to a clamp circuit 422, which defines the maximum and minimum range of the OTA current. The output of clamp circuit 422 is output to the adder. The compensation ramp generator circuit 423 then creates a ramp signal, which is synchronous to the clock, which is also output to the adder. The compensation ramp must subtract from the peak current limit, defined by the OTA current, and the compensation ramp can be viewed as a negative ramp current. The peak-current servo current 424 is also output to the adder. This current acts as an offset to remove the DC effect of the compensation ramp. All three currents, 422, 423, and 424, are inputs to the adder. The adder sums the currents and the resulting combined output current is used by the Buck switching converter in 426 as the peak current limit.

The summed current from the adder is sinked through the sense device, which is a small, scaled device, matched with the pass-device. This is indicated in 428 by the upper pair of series-connected devices. The voltage this creates, with respect to the supply voltage, is compared with the LX voltage. The LX voltage is sensed through a matched pair of series-connected devices, indicated in 428 by the lower pair of series connected devices. The SNS part of the name indicates that this is an impedance-matched sense signal, not the direct LX voltage.

In 428 the main pass-device pair is shown on the left. There is a pair of devices through which the summed peak-limit current is sinked. This generates a voltage drop with-respect-to the supply voltage. If the drop across the pass-device is greater than this reference voltage-drop, the output current is higher than the peak current limit. The lower-pair of series connected devices are used as impedance matching devices to ensure the sense path has the same impedance as the reference path.

FIG. 4 is an example showing two peak-mode phases and one valley-mode phase. There can be any combination of one or more peak-mode phases and one or more valley-mode phases.

The high side device of the peak current servo is typically, but not limited to, a PMOS device.

Figure 5:
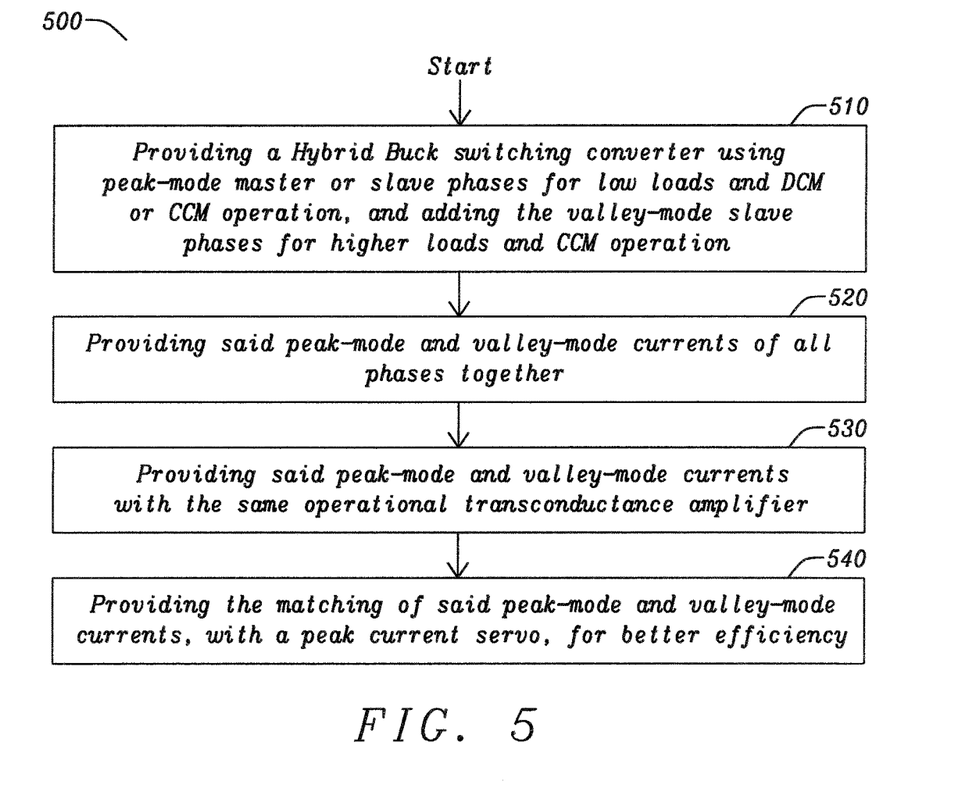
FIG. 5 is a flow chart illustrating a method for implementing a Hybrid Buck switching converter, embodying the principles of the disclosure.

FIG. 5 is flow chart 500 of a method for implementing a Hybrid Buck switching converter, embodying the principles of the disclosure. Step 510 illustrates a a Hybrid Buck switching converter providing both peak-mode master or slave phases for low loads and DCM or CCM operation, and adding valley-mode slave phases for higher loads and CCM operation. Step 520 shows a Hybrid Buck switching converter providing the peak-mode and valley-mode currents of all phases together. Step 530 illustrates a Hybrid Buck switching converter providing both the peak-mode and valley-mode currents with a common operational transconductance amplifier. Step 540 shows a Hybrid Buck switching converter providing the matching of the peak-mode and valley-mode currents, with a peak current servo, for better efficiency.

The advantages of one or more embodiments of the present disclosure include a simple implementation of a high frequency Buck switching converter, giving the benefits of small value coils, with reduced PCB area and improved load transient response, and the efficiency of large value coils. The Hybrid Buck disclosed allows for a separate current control from the main valley-mode CCM control loop. The Factor Of Merit of DCDC, to transmit maximum power with maximum efficiency using the smallest footprint is improved, and high VIN to low VOUT is supplied over a very wide ILOAD range.

While this invention has been particularly shown and described with reference to the preferred embodiments thereof, it will be understood by those skilled in the art that various changes in form and details may be made without departing from the spirit and scope of the invention.

The invention claimed is:

1. A Hybrid Buck switching converter, comprising:
one or more peak-mode phases and
one or more valley-mode phases,
wherein said peak-mode phases and said valley-mode phases are in use at the same time, in a multiphase converter, and configured to have coil currents controlled by a common control signal from an operational transconductance amplifier (OTA), using a peak current servo.

2. The Hybrid Buck switching converter of claim 1, wherein a peak current limit is configured for a peak-mode master phase and one or more peak-mode slave and valley-mode slave phases.

3. The Hybrid Buck switching converter of claim 1, wherein said peak-mode phases are configured to always be enabled and said valley-mode phases are configured to be enabled only at high currents.

4. The Hybrid Buck switching converter of claim 1, wherein a master phase is configured to operate at low loads, use peak-mode control, and support discontinuous mode operation.

5. The Hybrid Buck switching converter of claim 1, wherein a slave phase is configured to operate at high loads, use valley-mode control, and support continuous conduction mode or to operate at low loads, or use peak-mode control, and support continuous conduction mode.

6. The Hybrid Buck switching converter of claim 1, wherein not all said peak-mode phases are configured to support discontinuous mode operation.

7. The Hybrid Buck switching converter of claim 1, wherein a master phase is configured for a much lower switching frequency and a much higher value inductor than a slave phase.

8. The Hybrid Buck switching converter of claim 1, wherein a slave phase is configured for a much higher switching frequency and a much smaller value inductor than a master phase or for a much lower switching frequency and a much higher value inductor similar to said master phase.

9. The Hybrid Buck switching converter of claim 2, configured such that there is no limit to the number of said master and slave phases defined.

10. The Hybrid Buck switching converter of claim 1, wherein multiple master phases are configured to operate at different frequencies and with different coil values than other master and slave phases.

11. The Hybrid Buck switching converter of claim 1, wherein multiple slave phases are configured to operate at different frequencies and with different coil values than other master and slave phases.

12. A method for operating a Hybrid Buck switching converter, comprising the steps of:
providing a Hybrid Buck switching converter comprising peak-mode master or slave phases for low loads and DCM or CCM operation, and valley-mode slave phases for higher loads and CCM operation; and
controlling the currents of the peak-mode and valley-mode phases with a common control signal from an operational transconductance amplifier (OTA) using a peak current servo.

13. The method for operating a Hybrid Buck switching converter, of claim 12, wherein said peak-mode master or slave phases are always used and said valley-mode slave phases are only used at high currents.

14. The method for operating a Hybrid Buck switching converter, of claim 12, wherein both peak-mode and valley-mode phases are operated simultaneously.

15. The method for operating a Hybrid Buck switching converter, of claim 12, wherein said master and slave phases are controlled by the same operational transconductance amplifier (OTA) control current programmed to a maximum value, and said OTA current comprises a peak current limit in said peak-mode phases, and a valley limit current in said valley-mode phases.

16. The method for operating a Hybrid Buck switching converter, of claim 12, wherein the coil currents between said peak-mode and said valley-mode phases are matched using a peak current servo.

17. A Hybrid Buck switching converter, comprising:
a transconductance (gm) stage, further comprising:
an operational transconductance amplifier (OTA) configured to produce a peak current limit, proportional to a digital to analog converter (DAC) reference voltage compared to an output feedback voltage; and
multiple phases, wherein one or more phases operate in peak-mode current control and one or more phases operate in valley-mode current control, each of said phases comprising:
a peak current servo configured to match said peak-mode and valley-mode currents to said OTA peak current limit;
matched supply reference currents;
comparator logic configured to turn the high side device of said peak current servo off;
control logic configured to modify an offset current to move said peak-mode and valley-mode currents closer to said current limit; and
compensation ramps configured to subtract from said peak-mode current controls and to add to said valley-mode current controls, to prevent sub-harmonic oscillation.

18. The Hybrid Buck switching converter of claim 17, wherein said peak current limit is configured with said peak current servo for a peak-mode master phase and one or more peak-mode slave and valley-mode slave phases.

19. The Hybrid Buck switching converter of claim 17, wherein said peak-mode and valley-mode phases are configured to operate simultaneously.

20. The Hybrid Buck switching converter of claim 17, configured such that there is no limit to the number of said master and slave phases defined.

21. The Hybrid Buck switching converter of claim 17, wherein said master and slave phases are configured to a common operational transconductance amplifier (OTA) current, programmed to a maximum value.

22. The Hybrid Buck switching converter of claim 17, wherein said OTA current is configured to comprise said peak current limit in said peak-mode phases, and valley limit current in said valley-mode phases.

23. The Hybrid Buck switching converter of claim 17, wherein said peak-mode and said valley-mode phases are configured using said peak current servo.

* * * * *